(12) United States Patent
Troia

(10) Patent No.: US 9,557,926 B2
(45) Date of Patent: *Jan. 31, 2017

(54) INTEGRITY OF AN ADDRESS BUS

(71) Applicant: MICRON TECHNOLOGY, INC., Boise, ID (US)

(72) Inventor: Alberto Troia, Carlentini (IT)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/620,474

(22) Filed: Feb. 12, 2015

(65) Prior Publication Data

US 2015/0160874 A1    Jun. 11, 2015

Related U.S. Application Data

(63) Continuation of application No. 13/490,633, filed on Jun. 7, 2012, now Pat. No. 9,009,570.

(51) Int. Cl.
*G06F 3/06* (2006.01)
*G06F 11/10* (2006.01)
*G06F 3/023* (2006.01)
*G06F 13/16* (2006.01)

(52) U.S. Cl.
CPC ........... *G06F 3/0619* (2013.01); *G06F 3/0665* (2013.01); *G06F 3/0689* (2013.01); *G06F 11/10* (2013.01); *G06F 11/1016* (2013.01); *G06F 13/16* (2013.01)

(58) Field of Classification Search
CPC .... G06F 3/0619; G06F 3/0665; G06F 3/0689; G06F 11/10; G06F 11/1016; G06F 13/16
See application file for complete search history.

(56) References Cited

U.S. PATENT DOCUMENTS

| | | |
|---|---|---|
| 4,214,303 A | 7/1980 | Joyce et al. |
| 4,672,614 A | 6/1987 | Yoshida |
| 4,799,222 A | 1/1989 | Barlow et al. |
| 5,678,020 A | 10/1997 | Singh et al. |
| 6,912,616 B2 | 6/2005 | Heap |
| 6,931,576 B2 | 8/2005 | Morrison et al. |
| 7,026,850 B2 | 4/2006 | Atyunin et al. |
| 7,293,221 B1* | 11/2007 | Wong et al. .................. 714/768 |
| 7,571,297 B2 | 8/2009 | Gould et al. |

(Continued)

FOREIGN PATENT DOCUMENTS

| | | |
|---|---|---|
| EP | 1 679 598 A2 | 7/2006 |
| JP | 07-105102 | 4/1995 |

(Continued)

OTHER PUBLICATIONS

Jedec, "LPDDR-NVM Memory Standard", Arlington, VA, Nov. 29, 2007, 2 pgs.

(Continued)

*Primary Examiner* — April Y Blair
*Assistant Examiner* — Dipakkumar Gandhi
(74) *Attorney, Agent, or Firm* — Dicke, Billig & Czaja, PLLC

(57) ABSTRACT

A memory device has a controller, an address integrity feature, and an address register. The controller is configured to store error correction data in the address register when the address integrity feature is enabled.

24 Claims, 6 Drawing Sheets

(56) References Cited

U.S. PATENT DOCUMENTS

| | | | |
|---|---|---|---|
| 7,694,196 | B2 | 4/2010 | Schnell et al. |
| 7,804,735 | B2 | 9/2010 | Mao et al. |
| 7,937,631 | B2 | 5/2011 | Vogelsang |
| 8,135,935 | B2 | 3/2012 | Haertel et al. |
| 8,307,180 | B2* | 11/2012 | Hyvonen et al. ............. 711/163 |
| 2003/0163767 | A1 | 8/2003 | Phelps |
| 2005/0114750 | A1* | 5/2005 | Deegan et al. ............... 714/763 |
| 2005/0125708 | A1 | 6/2005 | Simon |
| 2006/0123320 | A1 | 6/2006 | Vogt |
| 2006/0203601 | A1 | 9/2006 | Pawlowski |
| 2007/0088921 | A1 | 4/2007 | Kim et al. |
| 2007/0133315 | A1 | 6/2007 | Kang et al. |
| 2007/0250756 | A1* | 10/2007 | Gower ............... G06F 11/1044 714/763 |
| 2008/0168331 | A1 | 7/2008 | Vogelsang et al. |
| 2009/0013233 | A1 | 1/2009 | Radke |
| 2009/0271678 | A1 | 10/2009 | Schneider et al. |
| 2010/0318718 | A1 | 12/2010 | Eilert et al. |
| 2012/0246542 | A1 | 9/2012 | Moyer et al. |

FOREIGN PATENT DOCUMENTS

| | | | |
|---|---|---|---|
| JP | 2000-066962 | | 3/2000 |
| JP | 2000066962 A * | | 3/2000 |
| JP | 2008-090442 | | 4/2008 |
| JP | 2010-003389 | | 1/2010 |
| JP | 2011-108252 | | 6/2011 |
| WO | WO 2006057963 A2 * | | 6/2006 ............... G11C 5/04 |

OTHER PUBLICATIONS

Jedec, "Low Power Double Data Rate (LPDDR) Non-Volatile Memory (NVM) Specification", Arlington, VA Jan. 2007. 70 pgs.

Japanese Office Action for JP Application No. 2015-516114 mailed Jan. 19, 2016 (3 Pages). The US counterpart of JP 2008-521160-A is 2006/0123320.

European Search Report for EP Application No. 13800122.7 mailed Nov. 23, 2015 (6 pages).

* cited by examiner

INTEGRITY OF AN ADDRESS BUS

RELATED APPLICATION

This application is a continuation of U.S. application Ser. No. 13/490,633, titled "IMPROVING INTEGRITY OF AN ADDRESS BUS," filed Jun. 7, 2012 and issued as U.S. Pat. No. 9,009,570 on Apr. 14, 2015, which is commonly assigned and is incorporated in its entirety herein by reference.

FIELD

The present embodiments relate generally to memory and a particular embodiment relates to improving the integrity of an address bus of a memory.

BACKGROUND

Memory is typically provided as an integrated circuit(s) formed in and/or on semiconductor die(s), whether alone or in combination with another integrated circuit(s), and is commonly found in computers or other electronic devices. There are many different types of memory including random-access memory (RAM), read only memory (ROM), dynamic random access memory (DRAM), synchronous dynamic random access memory (SDRAM), and flash memory.

Flash memories have developed into a popular source of non-volatile memory for a wide range of electronic applications. Flash memories typically use a one-transistor memory cell that allows for high memory densities, high reliability, and low power consumption. Changes in threshold voltage of the cells, through programming of a charge storage structure, such as floating gates or trapping layers or other physical phenomena, determine the data state of each cell. Common uses for flash memory include personal computers, digital cameras, digital media players, digital recorders, games, appliances, vehicles, wireless devices, cellular telephones, and removable memory modules.

FIG. 1 illustrates one example of a typical prior art system that incorporates a flash memory 100. The system also includes a controller 101 that is coupled to the memory device 100.

The controller 101 is shown coupled to the memory device 100 over a data bus 105, a control bus 106, and an address bus 107. In one embodiment, the data bus could be a 32 bit and/or 16 bit wide double data rate (DDR) bus.

If the system of FIG. 1 was incorporated into an electrically noisy environment such as an automobile or an aircraft, it could be subjected to a substantial amount of noise due to ignition systems and/or communication systems. Thus the integrity of the various buses 105-107 could be compromised. Various standards (e.g., ISO26262) have been implemented to ensure the integrity of information over the buses by providing guidelines as to suggested integrity standards.

For the reasons stated above and for other reasons that will become apparent to those skilled in the art upon reading and understanding the present specification, there is a need in the art to increase the integrity of one or more of the buses in a system.

DETAILED DESCRIPTION

Figure 1:
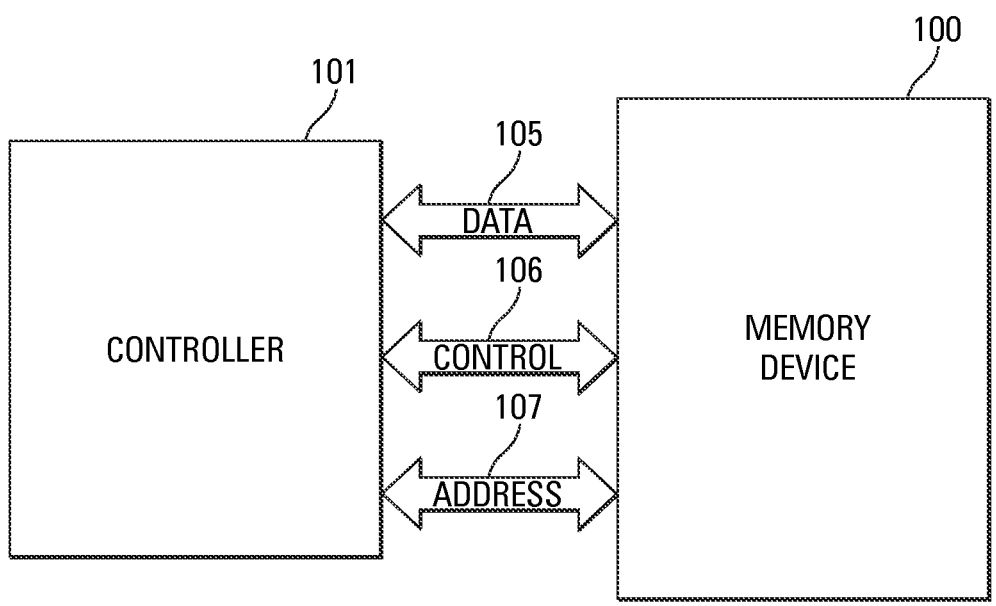
FIG. 1 shows a typical prior art system.

In the following detailed description, reference is made to the accompanying drawings that form a part hereof and in which is shown, by way of illustration, specific embodiments. In the drawings, like numerals describe substantially similar components throughout the several views. Other embodiments may be utilized and structural, logical, and electrical changes may be made without departing from the scope of the present disclosure. The following detailed description is, therefore, not to be taken in a limiting sense.

Figure 2:
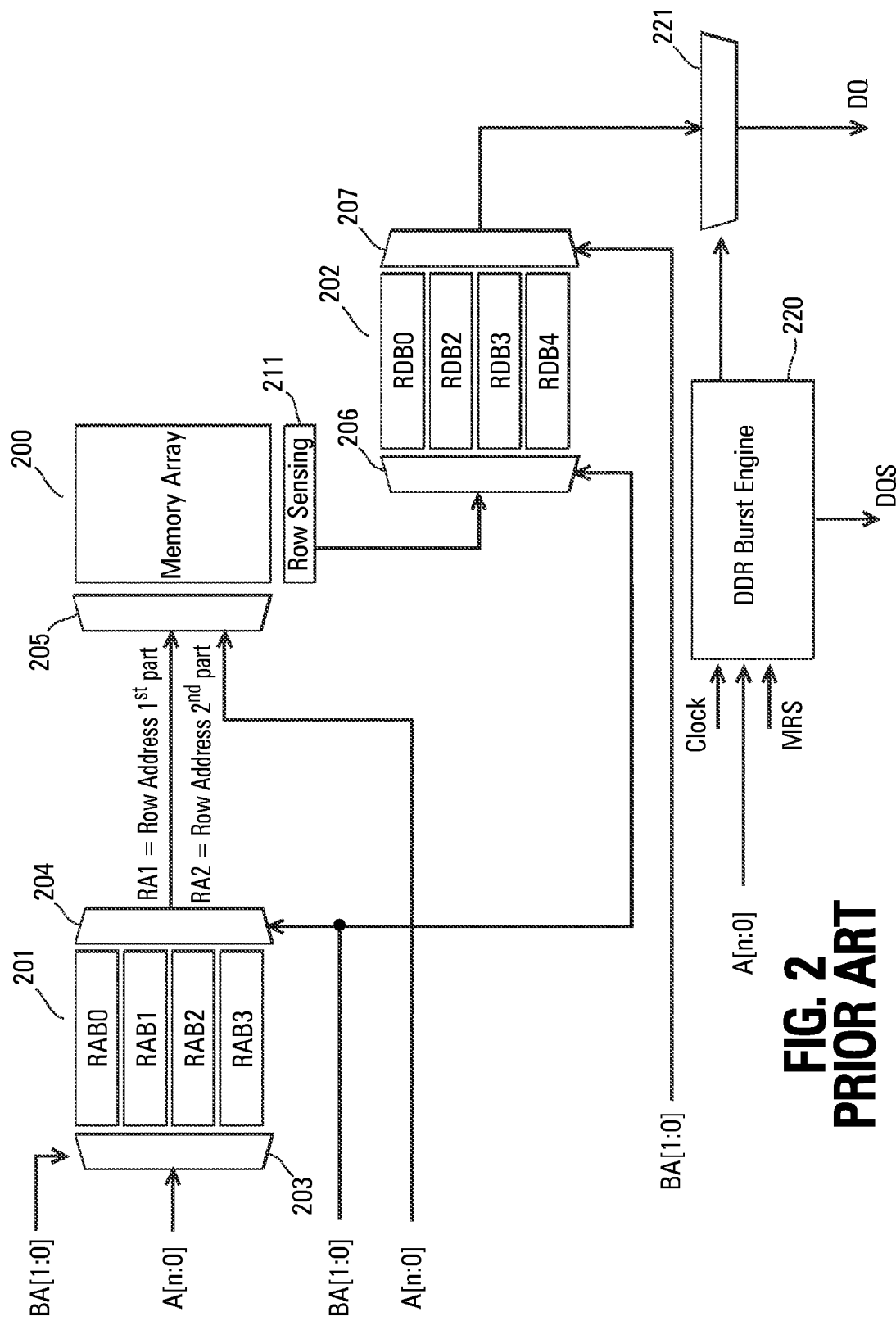
FIG. 2 shows a block diagram of a typical prior art implementation of a read operation.

FIG. 2 illustrates a block diagram of a typical prior art Joint Electron Devices Engineering Council (JEDEC) implementation of a read operation in a non-volatile memory device. As is well known in the art, JEDEC standards provide standardization of electronic components (e.g., non-volatile memory, controllers) so that one JEDEC-compliant memory device or controller from one manufacturer can be replaced with a similar JEDEC-compliant memory device or controller from another manufacturer. While subsequent discussions of the embodiments for improving the integrity of an address bus refer to JEDEC implementations of command, address, and data formats, the present embodiments are not limited to any one standard or format.

In the JEDEC implementation, the address A[n:0] is divided into two parts. These two parts are subsequently referred to as row address 1 (RA1) for the first part and row address 2 (RA2) for the second part. The RA1 is stored in one of a set of row address buffers 201 that are labeled RAB0-RAB3. A JEDEC control signal BA[1:0] is a buffer select signal that selects which of the row address buffers 201 is selected to store RA1 by controlling which output of a multiplexer 203 is connected to the input address A[n:0].

The control signal BA[1:0] is active during the Pre-Active and Active time periods (as discussed subsequently with reference to FIG. 3) in order to select which specific page is needed to be read from the memory array 200. This signal can have one of four different states (e.g., 00, 01, 10, 11) in order to select one of the four address buffers 201. The control signal BA[1:0] is also used to control an output multiplexer 204 that is coupled to and selects one of the outputs of the row address buffers 201.

Both of the first and second parts of the address (RA1 and RA2) are input to the memory array 200 through another multiplexer 205 during the read operation. The memory array 200 is also coupled to a row sensing circuit 211 that senses the state of particular memory cells that are selected in response to the two row address parts.

The output of the row sensing circuit 211 is coupled to a set of row data buffers 202 RDB0-RDB3 through a multiplexer 206 that is controlled by the BA[1:0]. Thus, the BA[1:0] signal selects into which row data buffer 202 the sensed data is input. Similarly, the BA[1:0] signal is used as a control input to an output multiplexer 207 that is coupled to the outputs of the row data buffers 202 to select which of the buffer outputs is coupled to a data output multiplexer 221.

A double data rate (DDR) burst engine 220 is coupled to the control input of the data output multiplexer 221. The DDR burst engine 220 uses a clock, the row address (A[n:0]), and some of the configuration bits in the Mode Register Set (MRS) to control the burst output of data (DQ) from the DQ multiplexer 221.

Figure 3:
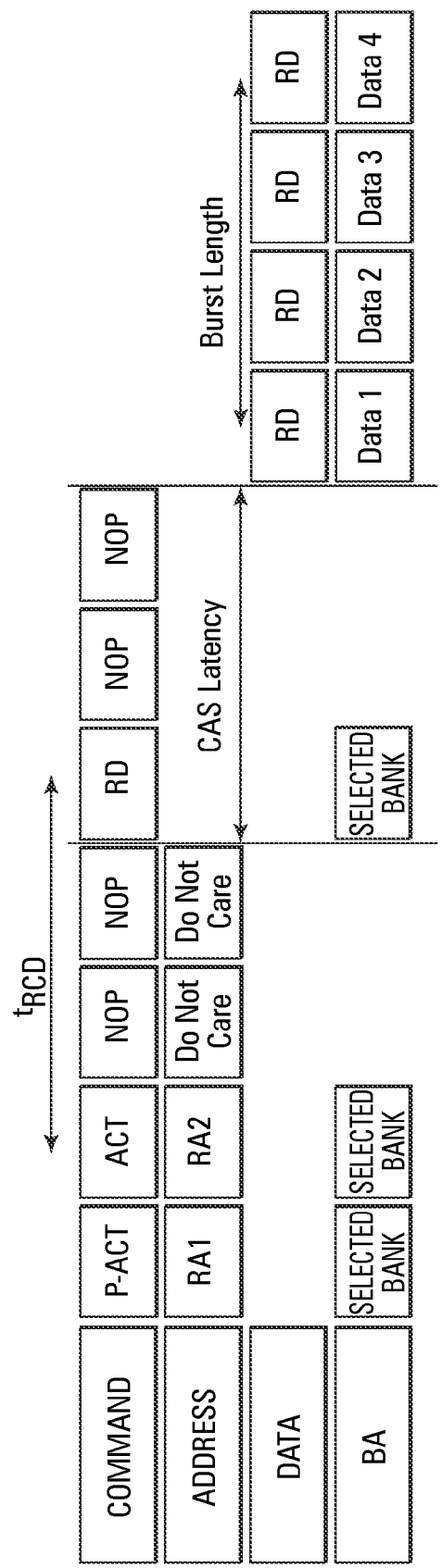
FIG. 3 shows a timing diagram of a typical prior art command and address sequence in accordance with the embodiment of FIG. 2.

FIG. 3 illustrates a timing diagram of a typical prior art command and address sequence in accordance with the embodiment of FIG. 2. This figure shows what is occurring on each of the command, address, and data buses between a memory device and an external controller.

Referring to both FIGS. 2 and 3, the command bus initially has a JEDEC pre-active instruction (P-ACT). This instruction instructs the memory device to accept the first part of the row address RA1 that is on the address bus. The first part of the row address is input to the row address buffers 201 RAB0-RAB3 based on the selected bank access BA[1:0] signal that is on the BA bus.

After the P-ACT instruction, the command bus has a JEDEC active (ACT) instruction that instructs the memory device to accept the second part of the row address RA2 that is on the address bus. Additionally during the ACT instruction, RA2 is applied to the memory array with the first part of the row address RA1. The array sensing is also initiated by the ACT instruction.

After the ACT instruction, can have one or more NOP instructions on the command bus. If the NOP instructions are on the command bus, the address bus is in a do not care state during this time. The command bus then has a read instruction (RD) that instructs the memory device to select the first page(s) of the selected row data buffer 202 RDB0-RDB3 based on the selected bank access BA[1:0] signal that is on the BA bus. The selected data is output to the DQ output.

The command bus also includes a plurality of no-operation (NOP) instructions after the read instruction RD. The NOP instructions are included as part of a particular JEDEC standard to increase the latency after RA2 is transmitted over the address bus prior to the selected read data being available on the data bus to the controller. In the illustrated embodiment, two NOP instructions are used on the command bus to generate column address strobe latency of three. However, alternate embodiments that use other standards can use more or less NOP instructions to adjust the latency.

The selected read data (RD) are now available on the data bus. FIG. 3 shows a plurality of read data (RD) as determined by the burst length. The burst length is the number of data words that are requested by the controller to be read.

FIG. 3 also shows a time $t_{RCD}$ that represents the time between the ACT instruction and the RD instruction. This is a predetermined time that is set by a particular JEDEC standard (e.g., non-volatile low power double data rate (NVM-LPDDR)) that any compliant device should respect for proper operation. The particular JEDEC standard allows the NOP instructions to be inserted between instructions on the command bus that adjusts the time between the ACT instruction and the RD instruction in order to meet this time specification.

In order to improve the integrity of the address bus in a memory system, error correction code (ECC) data can be generated by a controller (which can be any number of different transmitting devices) for a corresponding address. The ECC data is transmitted over the address bus, e.g., after transmitting the corresponding address, to the memory device. The memory device can then use the ECC data to correct the received address.

Figure 4:
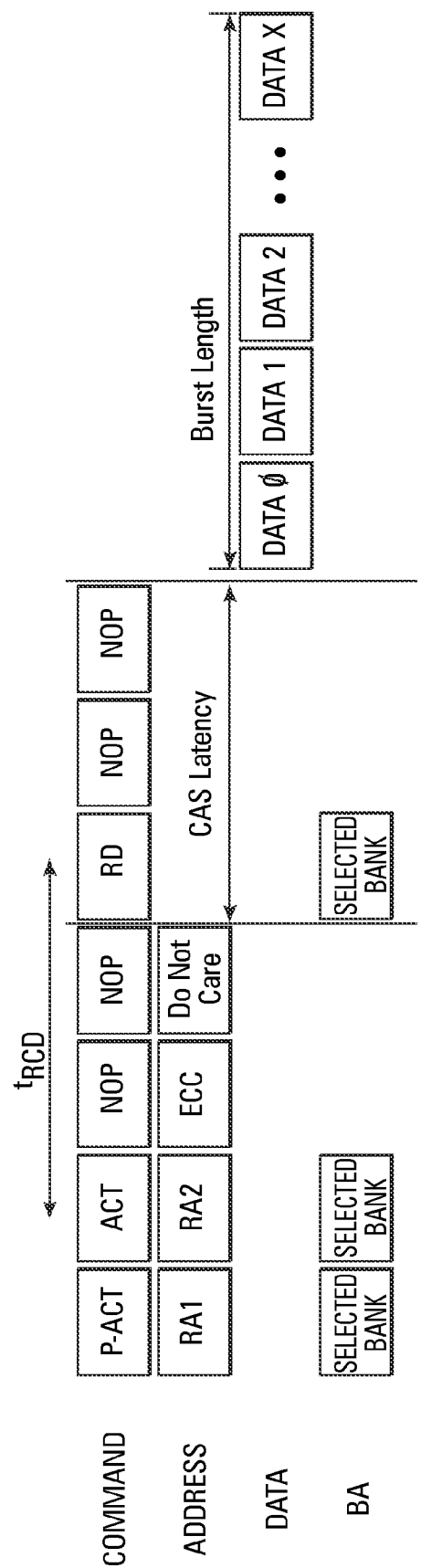
FIG. 4 shows a timing diagram of one embodiment of a command and address sequence in accordance with the embodiment of FIG. 5.

FIG. 4 illustrates a timing diagram wherein a NOP is used between the ACT instruction and the RD instruction, thus allowing the ECC data to be transmitted over the address bus coincident with the NOP instruction (e.g., transmitting at least a portion, and in some embodiments all, of the ECC data at a time that would be operative with respect to at least a portion, and in some embodiments all, of the NOP instruction, if the NOP instruction would have been an operative instruction; this can include, but is not limited to, for example, transmitting the ECC data and the NOP instruction at a same time). The ECC data can then be used to improve the address bus integrity as described subsequently. Any method to detect and correct an error in an address pattern can be used in the present embodiments. For example, a 2 bit detection and 1 bit correction algorithm might be used to generate the ECC data. The use of the ECC data in a memory device is discussed subsequently with reference to FIG. 5.

FIG. 4 shows that the command bus has the P-ACT instruction while the address bus has the first part of the row address (RA1) and the bank access bus (BA) has the bank select signal BA[1:0]. The P-ACT instruction instructs the memory device to accept the first part of the row address RA1 that is on the address bus.

After the P-ACT instruction, the command bus has the active ACT instruction that instructs the memory device to accept RA2 that is on the address bus. The bank access signal BA[1:0] is on the BA bus. The array sensing is also initiated by the ACT instruction.

A NOP instruction follows the ACT instruction on the command bus. The NOP instruction on the command bus allows for the ECC data to be transmitted over the address bus at the same time. The ECC data includes the error correction data for the previously transmitted address. If the address integrity feature is enabled, an internal controller 551 (FIG. 5) of the memory device can accept the ECC data and store it in a register as discussed subsequently. If the address integrity feature is disabled, the ECC data can be ignored by the internal controller 551.

The size of the ECC data can be dependent on the configured burst page length. In one embodiment, the size of the ECC data is at least equal to the number of the address lines. For example, for an address of 128 bits, the ECC would be at least 7 bits and an address of 256 bits would use at least 8 bits for ECC data. Alternate embodiments that use other error detection and correction algorithms could use a different size for the error correction bits.

The address integrity feature can be turned on or off by setting a bit in a register. For example, the external controller can transmit a control word to a mode register in a memory device that sets a bit indicating that the memory device is to accept error correction data for the address. In an alternate embodiment, an internal controller in the memory device can set the address integrity bit in the mode register to turn on this feature. The external controller can then read this bit indicating that the external controller should generate and/or transmit address error correction data over the address bus as shown in FIG. 4.

Referring again to FIG. 4, after the first NOP instruction, the command bus can have one or more additional NOP instructions in order to satisfy $t_{RCD}$. During this time, the address bus is in a do not care state. Subsequently, the command bus has the read instruction RD that instructs the memory device to select the first page(s) of the selected row data buffer RDB0-RDB3 based on the BA[1:0] signal. The selected data is output to the DQ output.

The command bus also includes a plurality of no-operation (NOP) instructions after the read instruction RD. The NOP instructions are included as part of the implemented JEDEC standard to increase the latency after RA2 is transmitted over the address bus prior to the selected read data being available on the data bus to the controller. In the illustrated embodiment, two NOP instructions are used on the command bus to generate column address strobe latency of three. However, alternate embodiments that use other standards can use more or fewer NOP instructions to adjust the latency.

The selected read data (DATA0-DATAx) are now available on the data bus. FIG. 4 shows a plurality of read data as determined by the burst length. The burst length is the number of data words that are requested by the controller to be read by the controller. In one embodiment, the controller can transmit a command to the memory device that sets the burst length.

Figure 5:
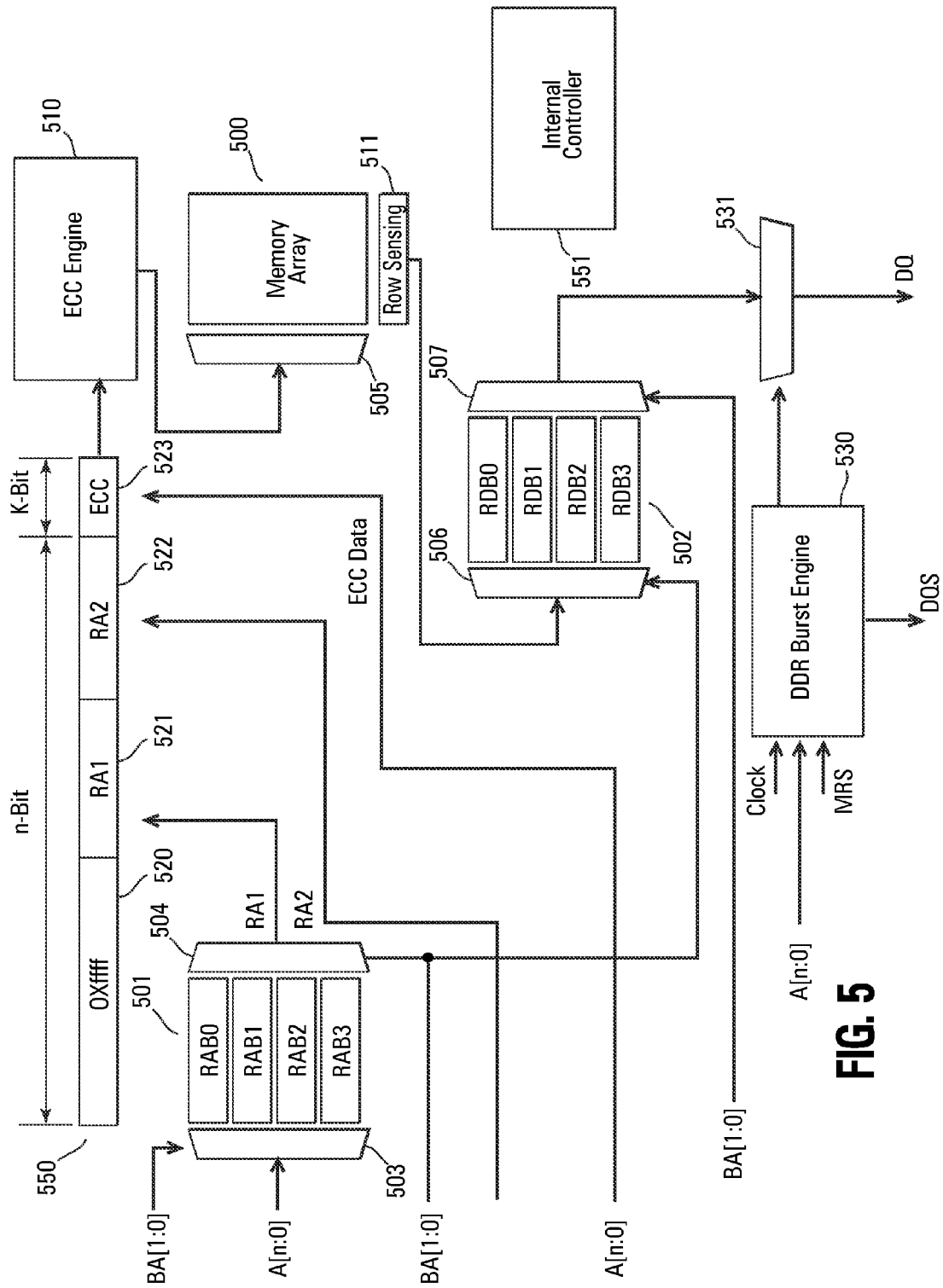
FIG. 5 shows a block diagram of one embodiment of an implementation of a read operation.

FIG. 5 illustrates a block diagram of one embodiment of a JEDEC implementation of a read operation that is implemented with the address integrity feature as illustrated in FIG. 4. Alternate embodiments can implement the address integrity feature using different standards than the JEDEC standard illustrated.

Referring to both FIGS. 4 and 5, during the P-ACT instruction a first part of the row address (RA1) is stored in one of the row address buffers 501 RAB0-RAB3. The address A[n:0] is applied to an address multiplexer 503 that is controlled by the JEDEC control signal BA[1:0]. The address multiplexer 503 then accepts only RA1 for storage in the selected row address buffer 501 RAB0-RAB3 as controlled by BA[1:0]. The outputs of the multiplexer 503 are each coupled to a different one of the row address buffers RA0-RA3.

During the ACT instruction, a second part of the address (RA2) is stored in a field 522 of an address register 550. A selected one of the RA1 addresses, as selected by BA[1:0] from one of the row address buffers RA0-RA3 through an output multiplexer 504, is also stored in a field 521 of the address register 550 at this time. The memory array 500 sensing through sense circuitry 511 is initiated by the ACT instruction.

During the NOP instruction (assuming the address integrity feature is enabled), the ECC data is stored in a k-bit field 523 of the address register 550. As seen in the timing diagram of FIG. 4, the ECC data is input to the address register 550 by the address bus A[n:0]. If the address integrity feature is not enabled, the ECC field 523 can either be left empty or programmed with do not care data.

In one embodiment, the address register 550 comprises a plurality of fields 521-523 comprising only RA1, RA2, and the ECC data. In another embodiment, another field 520 can be used in the address register 550 to increase the length of the RA1 and RA2 address fields 521, 522 to an n-bit field as necessary by any particular JEDEC standard. The data in the extra field 520 can be do not care data.

The address register 550 is coupled to an ECC engine 510 that reads the data in the address register 550 and corrects the addresses RA1 and RA2 as indicated by the ECC data. If the ECC data indicates that the addresses RA1 and RA2 do not contain one or more errors, the ECC engine 510 applies that address to the memory array 500 through a multiplexer 505. This address is used to select particular memory cells for sensing by the row sensing circuit 511. If the ECC data indicates that the addresses RA1 and RA2 contain one or more errors, the ECC engine 510 attempts to correct the address prior to applying the address to the memory array 500.

The memory array 500 can comprise one of a plurality of technologies. For example, the memory array can be a NOR, NAND, or PCM non-volatile memory array. The memory array 500 can also be a volatile memory array such as dynamic random access memory. Other memory technologies can also use the method for improving address integrity.

The output of the row sensing circuit 511 is input to a set of row data buffers 502 RDB0-RDB3. A multiplexer 506 that is controlled by the BA[1:0] control signal determines into which row data buffer RDB0-RDB3 the data is stored. Similarly, the BA[1:0] signal is used as a control input to an output multiplexer 507 that is coupled to the outputs of the row data buffers 502 to select which of the buffer outputs is coupled to a data output multiplexer 531.

A double data rate (DDR) burst engine 530 is coupled to the control input of the data output multiplexer 531. The DDR burst engine 530 uses a clock, the row address (A[n:0]), and some configuration bits in the Mode Register Set (MRS) to control the burst output of data (DQ) from the data output multiplexer 531. In one embodiment, the external controller can set the burst length and rate by setting particular bits in a register such as the MRS register.

Figure 6:
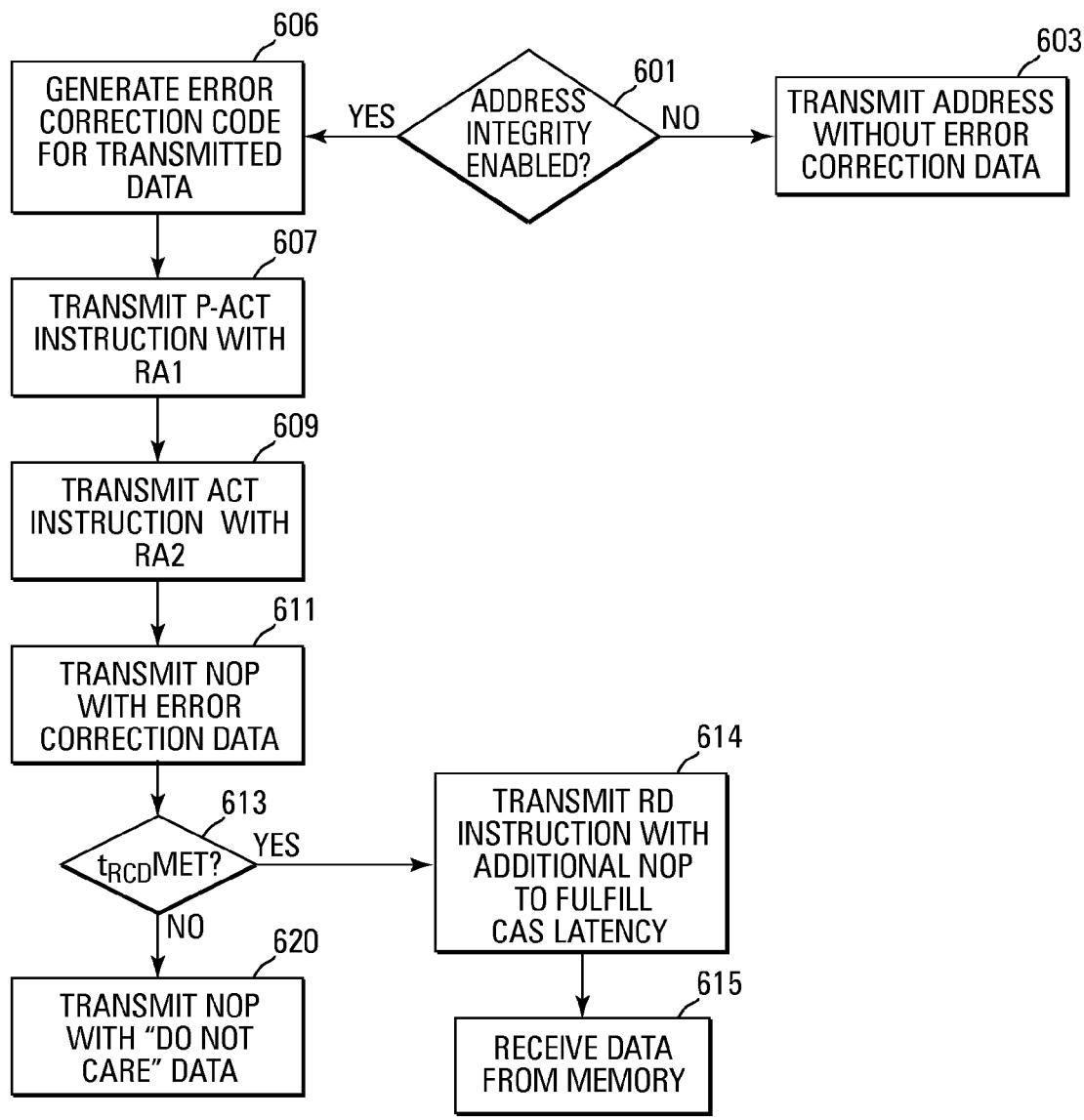
FIG. 6 shows a flow chart of one embodiment of a method for improving address integrity in a memory system.

FIG. 6 illustrates a flow chart of one embodiment of a method for improving address integrity in a memory system. The external controller determines if the address integrity feature is enabled 601. This can be accomplished by reading a mode register in the memory device that has an address integrity bit. In one embodiment, when this bit is set to a logical 1, the address integrity feature is enabled and when the bit is set to a logical 0, the address integrity feature is disabled.

If the address integrity feature is enabled, the external controller generates error correction code (e.g., error correction data, ECC data) for the transmitted address 606. During the command sequence of a read operation, the external controller then transmits the P-ACT command over the command bus coincident with transmitting the row address over the address bus 607. The ACT command is then transmitted over the command bus coincident with transmitting RA2 over the address bus 609. A NOP instruction is then transmitted over the command bus coincident with the ECC data, generated for the address previously transmitted over the address bus 611.

If the method for improving address integrity is part of a read operation, the method could continue by determining if $t_{RCD}$ has been met 613. If not, NOP instructions are transmitted with "Do Not Care" data 620. If $t_{RCD}$ has been met 613, the external controller transmits a read instruction to the memory device over the command bus 614. The read instruction can be followed by one or more NOP instructions depending on the CAS latency required by the implemented standard. The memory device can then transmit the burst of data to the external controller over the data bus and the external controller receives the data 615.

If the address integrity feature is not enabled (e.g., disabled), the address can be transmitted without the ECC data 603. In one embodiment, the NOP instruction is also not transmitted over the command bus. In another embodiment, the NOP instruction is transmitted over the command bus and the ECC data is transmitted over the address bus but the memory device ignores the ECC data.

The P-ACT and ACT commands are commands associated with a particular JEDEC implementation of a standard. Alternate embodiments may not use such commands, depending on the standard being implemented, but can still transmit a NOP instruction over the command bus coincident with ECC data over the address bus.

CONCLUSION

In summary, one or more embodiments include a selectable address integrity feature that can improve the integrity of an address bus in a memory system. The controller generates error correction data corresponding to an address. The error correction data can be transmitted to the memory device over the address bus coincident with transmitting a NOP instruction over the command bus.

Although specific embodiments have been illustrated and described herein, it will be appreciated by those of ordinary skill in the art that any arrangement that is calculated to achieve the same purpose may be substituted for the specific embodiments shown. Many adaptations of the invention will be apparent to those of ordinary skill in the art. Accordingly, this application is intended to cover any adaptations or variations of the invention.

What is claimed is:

1. A memory device, comprising:
a memory array;
a controller;
an address integrity feature;
an address register; and
an error correction engine coupled between the memory array and the address register;
wherein the memory device is configured to store an indicator that is accessible to an external device and that indicates whether the address integrity feature is enabled or disabled;
wherein the controller is configured to store an address and error correction data received from the external device in the address register when the address integrity feature is enabled; and
wherein the error correction engine is configured to receive the address and the error correction data from the address register and to correct the address received from the address register as indicated by the error correction data received from the address register.

2. The memory device of claim 1, wherein the memory device is configured to receive the address and the error correction data from the external device over an address bus.

3. The memory device of claim 1, wherein the controller is configured to ignore the error correction data when the address integrity feature is disabled.

4. The memory device of claim 1, wherein the controller is configured to enable and to disable the address integrity feature.

5. The memory device of claim 4, wherein the controller being configured to enable and to disable the address integrity feature comprises the controller being configured to set the indicator to indicate that the address integrity feature is enabled when the controller enables the address integrity feature and to indicate that the address integrity feature is disabled when the controller disables the address integrity feature.

6. The memory device of claim 1, wherein the memory device is Joint Electron Devices Engineering Council compatible.

7. The memory device of claim 1, wherein the controller is configured to store an address in the address register without storing the error correction data in the address register when the address integrity feature is disabled.

8. The memory device of claim 1, wherein the indicator that is accessible to the external device is to be read by the external device.

9. A memory device, comprising:
a controller;
an address integrity feature; and
an address register;
wherein the controller is configured to store error correction data in the address register when the address integrity feature is enabled;
wherein the address register is configured to receive the error correction data from an address bus; and
wherein the memory device is configured to receive a no-operation instruction from a command bus coincident with the address register receiving the error correction data from the address bus.

10. A memory device, comprising:
a controller;
an address integrity feature; and
an address register;
wherein the controller is configured to store error correction data in the address register when the address integrity feature is enabled; and
wherein the controller is configured to store do not care data in the address register in place of the error correction data in the address register when the address integrity feature is disabled.

11. A memory device, comprising:
a controller;
an address integrity feature; and
an address register;
wherein the controller is configured to store error correction data in the address register when the address integrity feature is enabled; and
wherein the controller is configured to store the error correction data in a field of the address register when the address integrity feature is enabled and to leave that field of the address register blank when the address integrity feature is disabled.

12. A memory device, comprising:
a controller;
an address integrity feature; and
an address register;
wherein the controller is configured to store error correction data in the address register when the address integrity feature is enabled;
wherein the address integrity feature comprises a mode register to store an address integrity bit to indicate whether the address integrity feature is enabled or disabled; and
wherein the mode register is to be read by an external device.

13. A memory device, comprising:
an internal controller;
an address integrity feature; and
an address register;
wherein the memory device is configured to store an indicator that is to be read by an external controller and that indicates whether the address integrity feature is enabled or disabled;
wherein the internal controller is configured to store an address in the address register;
wherein the internal controller is configured to store error correction data, corresponding to the address, in the address register when the address integrity feature is enabled; and wherein the internal controller is configured to store the error correction data in the address register after the address is stored in the address register.

14. A memory device comprising:
a memory array;
a register configured to receive a memory address and error correction data corresponding to the memory address from an address bus; and
an error correction engine coupled to the memory array and configured to read the memory address and the error correction data corresponding to the memory address from the register;
wherein the memory device is configured to receive a no-operation instruction from a command bus coincident with the register receiving the error correction data from the address bus; and
wherein the error correction engine uses the error correction data corresponding to the memory address to determine whether the memory address contains errors.

15. The memory device of claim 14, wherein the error correction engine is configured to apply the memory address to the memory array in response to the error correction data indicating that the memory address does not contain errors.

16. The memory device of claim 14, wherein the error correction engine is configured to correct the memory address in response to the error correction data indicating that the memory address contains errors and to apply the corrected memory address to the memory array.

17. An apparatus, comprising:
a controller;
wherein the controller is configured to transmit error correction data to a memory device over an address bus coincident with transmitting a no-operation instruction to the memory device over a command bus.

18. The apparatus of claim 17, wherein the controller is configured to transmit an address, corresponding to the error correction data, to the memory device over the address bus before transmitting the error correction data to the memory device over the address bus coincident with transmitting the no-operation instruction to the memory device over the command bus.

19. The apparatus of claim 18, wherein the controller is configured to transmit a read instruction, corresponding to the address, to the memory device over the command bus after transmitting the no-operation instruction to the memory device over the command bus.

20. The apparatus of claim 18, wherein the controller being configured to transmit the address, corresponding to the error correction data, to the memory device over the address bus comprises the controller being configured to transmit a first portion of the address to the memory device over the address bus coincident with transmitting a first instruction to the memory device over the command bus and to transmit a second portion of the address to the memory device over the address bus coincident with transmitting a second instruction to the memory device over the command bus.

21. The apparatus of claim 17, wherein the controller is configured to read a mode register in the memory device to determine whether an address integrity feature of the memory device is enabled.

22. The apparatus of claim 21, wherein the controller is configured to transmit the error correction data to the memory device over the address bus coincident with transmitting the no-operation instruction to the memory device over the command bus in response the controller determining that the address integrity feature of the memory device is enabled.

23. The apparatus of claim 21, wherein the controller is configured to transmit an address to the memory device over the address bus without transmitting any error correction data to the memory device over the address bus in response to the controller determining that the address integrity feature of the memory device is disabled.

24. The apparatus of claim 21, wherein the controller is configured to enable and to disable the address integrity feature of the memory device.

* * * * *